United States Patent Office 3,547,659
Patented Dec. 15, 1970

3,547,659
BREAD FLAVOR AND AROMA ENHANCEMENT COMPOSITION
Winifred Cort, Lloyd Neck, N.Y., assignor to Hoffmann-La Roche Inc., Nutley, N.J., a corporation of New Jersey
No Drawing. Filed Dec. 8, 1967, Ser. No. 688,983
Int. Cl. A21d 2/24; A23l 1/22
U.S. Cl. 99—140
2 Claims

ABSTRACT OF THE DISCLOSURE

A composition is described which is produced by heating a mixture of (a) proline, (b) glycine, (c) valine, (d) glutamine, glutamic acid or a salt of the latter and (e) glycerol or propylene glycol. The use of such compositions for enhancing the flavor and aroma of bread, crackers, biscuits and like products is disclosed.

BRIEF SUMMARY OF THE INVENTION

The amino acids, proline, glycine, valine and glutamic acid or, in lieu of the latter, glutamine or a salt of glutamic acid, are admixed with glycerol or propylene glycol. The mixture, thus obtained, is heated to a temperature of up to about 150° C. for a period of up to about sixty minutes.

The composition which is thus produced is added to, and uniformly distributed throughout, the ingredients conventionally used in making bread, crackers and like bakery products. The mixture is, thereafter, baked to provide bread, crackers, biscuits or like bakery products having the desired flavor and aroma characteristics.

It has been found that, when the composition of this invention is incorporated into the ingredients used in making bread, crackers, biscuits, etc. a food product is obtained upon baking which has the characteristic freshly baked flavor and aroma.

BACKGROUND OF THE INVENTION

The factors which impart to freshly baked bread its characteristic flavor and aroma are presently the subject of considerable discussion in the art. However, there is agreement that, in the absence of compositions which serve to enhance the flavor and aroma thereof, bread which is made by conventional commercial continuous bread making processes is bland and lacking in flavor. One explanation for this is that the characteristic flavor and aroma is imparted to bread by the fermentation process which takes place during the formation of a gluten structure. In the case of bread which is not baked by continuous methods, a slow fermentation process occurs. However, when bread is made in continuous bread making machines, the slow fermentation step is eliminated. In the continuous process, the gluten structure is formed by high speed mixing. It has been suggested, therefore, that it is the elimination of the slow fermentation step in the continuous process which results in the production of bread which is devoid of the flavor and aroma normally associated with freshly baked bread. For obvious reasons, bread which is bland and lacking in flavor is not acceptable to the ultimate consumer.

DETAILED DESCRIPTION

The present invention provides a means whereby a desired flavor and aroma can be imparted to bread, crackers, biscuits and other bakery products.

In one specific embodiment, the invention provides a means whereby the bland taste of bread baked by continuous bread making processes is eliminated.

The objectives of the invention are accomplished by incorporating a flavor-aroma imparting composition, of the type hereinafter described, into the ingredients which will be converted, by baking, into the bread or bread product. The flavor-aroma imparting composition is produced by heating a mixture of the amino acids, proline, glycine, valine and glutamic acid or, in lieu of the latter, glutamine or a salt of glutamic acid, with glycerol or propylene glycol.

The term "bakery products" will be used in the present specification in a generic sense and, as such, it will be used to connote not only bread but also crackers, biscuits, cookies, and like baked goods.

The present invention is predicated on the production and use of a composition produced by heating the aforementioned ingredients in combination. Equally important, however, is the provision of the ingredients in the quantities hereinafter designated. However, while the quantity of each ingredient used in producing the flavor-aroma imparting composition of the invention is important, such quantities are variable within certain rather critical limits. Thus, for example, in its broadest embodiment, the invention embraces the production and use of a composition prepared by heating the following named ingredients in the quantities hereinafter indicated, the quantities being expressed in terms of percent by weight of the ingredients, based on the total weight of the composition:

| | |
|---|---|
| Proline | From about 10% to about 65%. |
| Glycine | From about 0.1% to about 20.0%. |
| Valine | From about 0.1% to about 20.0%. |
| Glutamic acid or glutamine or a salt of glutamic acid | From about 0.2% to about 20.0%. |
| Glycerol or propylene glycol | From about 15% to about 85%. |

Depending upon tht quantity of each ingredient used, one can impart to the bakery product, e.g., a cracker-like flavor and aroma; a biscuit-like flavor and aroma; a bread-like flavor and aroma. However, the preferred flavor-aroma imparting compositions of the invention, i.e., compositions which impart the flavor and aroma of freshly baked bread to bread produced by continuous bread making processes, are prepared by heating a mixture of the following named ingredients in the quantities hereinafter indicated, such quantities being expressed in terms of percent by weight of the ingredients present in the final composition:

| | |
|---|---|
| Proline | From about 35% to about 50%. |
| Glycine | From about 0.5% to about 1.5%. |
| Valine | From about 0.5% to about 1.5%. |
| Glutamic acid or glutamine or a salt of glutamic acid | From about 1.0% to about 3.0%. |
| Glycerol or propylene glycol | From about 45% to about 60%. |

The compositions of the invention are readily produced. The preparative method involves merely the step of heating the mixture at a temperature elevated above room temperature. After the heating step is completed, the composition, thus obtained, can be diluted with water to facilitate its uniform distribution throughout the mixture of ingredients which, ultimately, will be baked into the desired bakery product. It is to be fully understood, however, that the dilution of the product with water to facilitate its uniform distribution throughout the ingredients to be baked, is optional. By providing adequate mixing, the composition can be distributed throughout the ingredients in a completely satisfactory manner without first diluting it with water. In those embodiments of the invention where added water is used, that is, where the composition produced by heating is subsequently diluted, up to about 100 parts by weight of water can be provided for each part by weight of the composition to be diluted thereby. However, where water is added, it is preferred to employ from about 85 to about 100 parts by weight of water for each part by weight of the composition to be diluted thereby.

Individually, neither the temperature at which the mixture is heated nor the duration of the heating period is particularly critical. In gneral, the invention is carried out by heating the mixture at a temperature elevated above room temperature for a period of time sufficient to produce a composition which imparts satisfactory flavor and aroma characteristics to bakery products. Thus, in producing the present products, the heating temperature chosen for use and the duration of the heating step are interdependent. As a general rule, the use of lower temperatures will necessitate a longer heating period. Conversely, a shorter heating period will be required where the mixture is heated at higher temperatures. In any given instance, one can determine, by preliminary experimentation, the length of time that a mixture composed of particular quantities of the essential ingredients should be heated at a specific temperature. The criteria for such determination is whether the composition which is produced by heating at a particular temperature for a given period of time is such that it imparts to the bakery product the flavor and aroma sought to be achieved therein.

In general, the heating step will be carried out at a temperature within the range of from about 50° C. to about 175° C. The duration of the heating step will be adjusted appropriately to provide a product which has the desired flavor and aroma imparting characteristics. Under ordinary circumstances, a mixture heated to a temperature within the range of from about 50° to about 75° C. should, for best results, be maintained at such temperature for a period of at least about five minutes. If desired, however, the mixture can be maintained within the temperature range of from about 50° C. to about 75° C. for a substantially longer period, for example, up to sixty minutes. On the other hand, where the composition of the invention is produced by heating the mixture at a temperature within the range of from about 75° C. to about 150° C., it is not essential that the mixture be maintained at such temperature for any given period of time. Under such circumstances, a product having the capability of imparting flavor and aroma to a bakery product will be obtained merely by bringing the mixtures to the temperature and, thereafter, either cooling or allowing the mixture to cool, to room temperature. However, while it is not essential that the mixture be maintained at the elevated temperature when the heating is carried out at a temperature within the range of about 75° C. to 150° C., the mixture can be held at such temperature for an extended period of time, if desired.

As indicated heretofore, glutamic acid or, in lieu thereof, glutamine or a salt of glutamic acid, can be used in the practice of the invention. In general, any non-toxic and edible salt of the acid can be used. These include, for example, sodium salts, potassium salts, ammonium salts, etc., of glutamic acid. In the preferred embodiment of the invention, however, monosodium glutamate is employed.

Furthermore, while either glycerol or propylene glycol can be used in producing the flavor and aroma enhancing compositions of the invention, glycerol is preferably employed.

In carrying out the invention, proline, glycine, valine and glutamic acid or, in lieu of the latter, glutamine or the salt of glutamic acid, can be provided as separate chemical entities. If desired, however a product can be employed which contains the named ingredients in the relative quantitative proportions required to practice the present invention. For example, in lieu of the use of amino acids themselves, a product can be employed which contains from about 3 to about 100 parts by weight of proline for each part by weight of glycine; from about 3 to about 100 parts of proline for each part by weight of valine; and from about 3 to about 50 parts by weight of proline for each part of glutamic acid, glutamine or a salt thereof. The commercially available enzymatic hydrolyzed gelatins and the commercially available acid hydrolyzed gelatins are products of this nature. The term hydrolyzed gelatin, as used herein, denotes a gelatin in which some of the peptide bonds have been broken by acids or enzymes and has free proline. A hydrolyzed gelatin product which is very well suited for use in carrying out the present invention is available commercially from the Nutritional Biochemical Corporation, Cleveland, Ohio. Obviously, where a hydrolyzed gelatin product is used as the source of the amino acids, a sufficient quantity of gelatin product must be used to provide a mixture, which when added to glycerol or propylene glycol, contains from about 10% to about 65% by weight, preferably, 35% to about 50% by weight, of proline; from about 0.1% to about 20% by weight, preferably 0.5% to about 1.5% by weight of glycine; from about 0.1% to about 20% by weight, preferably, 0.5% to about 1.5% by weight, of valine; from about 0.2% to about 20% by weight, preferably, 1.0% to about 3.0% by weight of glutamic acid, glutamine or a salt of glutamic acid; and from about 10% to about 65%, preferably, from about 45% to about 60% by weight of glycerol or propylene glycol. In such embodiment of the invention, a composition having the desired flavor and aroma imparting properties and characteristics is obtained simply by heating the hydrolyzed gelatin product with glycerol or propylene glycol. The heating requirements in this embodiment of the invention are the same as those required where the mixture is made up of amino acids provided as separate entities. Thus, the mixture is heated ordinarily at a temperature of within the range of 50° C. to 175° C. The duration of heating and the heating temperautres being inter-related and so adjusted to provide a product which is capable of imparting the desired flavor and aroma to the bakery product. Generally, however, a longer heating period is required at lower temperatures while, at higher temperatures, a shorter heating period will suffice. A minimum of five minutes heating time will normally be required at a temperature within the range of from about 50° C. to 75° C. However, the heating step, carried out at a temperature within that range, can be up to about sixty minutes in duration. At a temperature above about 75° C., for example, at a temperature within the range of from about 75° C. to 150° C., it is not necessary, under ordinary circumstances, to maintain the mixture at such temperature for any given period of time. The objectives of the invention can be achieved simply by heating the mixture to a temperature of about 75° C., or higher, and cooling the mixture, or allowing it to cool, to room temperature.

The manner in which the flavor- and aroma-enhancing compositions of this invention are used in making bread, crackers, biscuits and other like bakery products will be readily apparent to persons skilled in the art. In general, the use of the present compositions in producing bakery products will not require equipment or a knowledge of techniques not now in the possession of the bakery industry. In their utilization, the compositions are incorporated into the mixture of ingredients ordinarily used in producing bread, crackers, biscuits or other bakery products. Distribution of the composition throughout the bread ingredients can be accomplished by any practical means. In the preferred embodiment of the invention, conventional mechanical mixing devices are used to accomplish the uniform distribution of the composition throughout the bread ingredients.

The quantity of the present composition which is incorporated into the bread, cracker, etc. ingredients is variable. In general, the flavor- and aroma-imparting characteristics of the compositions, taken with the degree of flavor and aroma to be imparted to the ultimate baked food product, will determine, in any given instance, the amount of the composition of the invention to be employed. Variations of flavor and aroma can be achieved by varying the quantity of the flavor/aroma enhancer used. Thus, the quantity to be used in producing a particular bakery product should be determined by preliminary experimentation. In general, however, there will be used a ratio of from about 0.00016 to about 0.0013 part by weight of the present compositions for each part by weight of flour employed. Where the composition is diluted with water prior to its use, a sufficient quantity of aqueous product should be used to provide from about 0.00016 to about 0.0013 part of the non-aqueous composition for each part by weight of flour. In one particular embodiment of the invention, the flavor and aroma of freshly baked bread is achieved by using a ratio of from about 0.0003 part by weight to about 0.0005 part by weight of a composition of this invention for each part by weight of flour. Where the composition is diluted with water prior to its use, a sufficient quantity of the aqueous product should be used to provide the non-aqueous composition of the invention in the designated ratio.

Although not necessarily restricted thereto, the invention is primarily useful in connection with the baking of bread by conventional continuous bread-making processes. A detailed description of the use of the present compositions in a typical continuous bread-making process will be found in the working examples which follow hereinafter. In general, however, the process entails, the preparation of a dough comprising yeast, sugar, a yeast food, flour and water. A yeast food, such as, calcium phosphate at a level of about 2 ounces per 100 pounds of flour is also added to the dough. The dough is pumped to a mixer, wherein flour, shortening (usually 3% of the weight of the flour) salt, milk (usually 1.0% to 6.0% of the weight of the flour) and oxidation compounds, i.e. a mixture of potassium iodate (10 p.p.m.), potassium bromate (50 p.p.m.) and ascorbic acid (10 to 100 p.p.m.), all such weights being based on the weight of the flour, are added. The composition of this invention is also added to the mixture at this point in the process. The ingredients are thoroughly mixed. The mixture, thus obtained, is cut into pieces, dropped into pans on a conveyor and conveyed into and through the baking ovens.

In addition to its utility in conventional bread making processes, the invention is used to impart flavor and aroma to bread baked in a non-continuous manner as well as to impart a desired flavor and aroma to other baked goods. Such other baked goods include, for example, crackers, biscuits, cookies. etc. The manner in which the compositions are used for such purposes will be readily apparent to persons skilled in the art. It should be sufficient to note that the compositions are added to the ingredients used in producing the bakery products prior to baking same.

In the preceding paragraphs, the addition of the compositions of this invention to a dough, immediately prior to baking same, has been discussed. It is to be understood, however, that the practice of the present invention is not limted thereto. It has been found that the compositions of the invention can be added to the dough and that the ensuing mixture can be kept refrigerated for subsequent baking without eventual loss of flavor or aroma.

For a fuller understanding of the nature and objects of this invention, reference may be had to the following examples which are given merely as further illustrations of the invention and are not to be construed in a limiting sense. All parts given in the examples are parts by weight, unless otherwise indicated.

EXAMPLE 1

(a) In this example, 2.0 parts of proline, 0.1 part of monosodium glutamate, 0.05 part of glycine and 0.05 part of valine were added to, and stirred in, 2.52 parts of glycerol. The stirred mixture was then heated to a temperature of 75° C. and it was maintained at that temperature for a period of about five minutes. Thereafter, 10 parts of water were added to the composition produced in the heating step.

(b) The product, thus obtained, was evaluated for its ability to impart flavor and aroma to bakery products. In this evaluation, 100 grams of a commercial flour mix containing flour and leavening were mixed with 27 grams of peanut oil and 62 grams of skim milk. Thereafter, 0.1 gram of the aqueous composition, produced as described in section (a) of this example, was added. The ingredients were mixed and the mixture was baked into biscuits by heating in an oven at a temperature of 450° F. for a period of about twelve minutes.

The biscuits, thus obtained, were submitted to, and evaluated for flavor and aroma by, a selected panel. The panel found the biscuits to have the flavor and aroma which is characteristic of freshly baked bread. For comparative purposes, biscuits were baked as described herein, using with but one exception, the same ingredients and the same quantities as were heretofore employed. The only difference between the two batches of biscuits was that, in producing the biscuits for comparative purposes, the composition of section (a) of this example was not used. The biscuits were submitted to the same taste panel referred to heretofore. It was the judgement of that panel that the biscuits obtained from the mixture which did not contain the composition of section (a) of this example were bland and lacking in flavor and aroma.

The foregoing results indicate that the composition of section (a) of this example was effective in imparting a freshly baked flavor and aroma to biscuits which otherwise would have been bland and lacking in flavor and aroma.

EXAMPLE 2

(a) In this example, 0.3 part of proline, 0.01 part of monosodium glutamate, 0.005 part of glycine and 0.005 part of valine were added to 0.5 part of glycerol. The mixture was heated, with stirring, to a temperature of 50° C. and maintained at such temperature for a period of about five minutes.

(b) A second product was prepared using the same ingredients and the same quantities thereof as were used in section (a) of this example. In this instance, however, the mixture was heated to a temperature of about 75° C., following which it was cooled immediately to room temperature.

(c) The products of sections (a) and (b) of this example were separately evaluated for their ability to impart flavor and aroma to bakery products. In evaluating each of the compositions, three doughs each comprising 100 grams of a commercial flour mix containing flour and leavening, mixed with 27 grams of peanut oil and 62 grams of reconstituted dried skim milk was first prepared. The product of section (a) was incorporated into one such dough and the product of section (b) was incorporated into a second. In each instance, the additive was introduced into the dough at a level of 0.03 gram. For control purposes, no flavor-aroma enhancer was added to the third dough. The separate doughs were baked into biscuits by heating in an oven at a temperature of 450° F. for a period of about twelve minutes.

The biscuits, thus produced, were submitted to a taste panel for evaluation. The panel found that the control biscuits were bland and lacking in flavor. However, the biscuits which were baked in the presence of the products of sections (a) and (b) of this example were found by the taste panel to possess the flavor and aroma characteristics of freshly baked bread.

EXAMPLE 3

(a) In this example, 5.0 parts of proline, 1.0 part of monosodium glutamate, 1.0 part of glycine and 1.0 part of valine was added to and stirred in 10.0 parts of glycerol. The stirred mixture was then heated to a temperature of about 150° C., following which it was cooled immediately to room temperature.

(b) A second product was produced using the same ingredients and the same quantities thereof as were used in section (a) of this example. In this instance, however, the mixture was heated to a temperature of about 75° C. and it was maintained at that temperature for a period of about one hour.

(c) A third product was produced in the same manner, and using the ingredients and quantities thereof, employed in section (b) of this example except that propylene glycol was used in place of glycerol.

(d) The products of sections (a), (b) and (c) of this example were separately evaluated for their ability to impart flavor and aroma to bakery products. In evaluating the products, four doughs, each comprising 100 grams of a commercial flour mix containing flour and leavening, mixed with 27 grams of peanut oil and 62 grams of reconstituted dried skim milk, was first prepared. The product of section (a) of this example was incorporated into one such dough; the product of section (b) of this example was incorporated into a second; and the product of section (c) was incorporated into a third dough. In each instance, the additive, i.e., the product of sections (a), (b), or (c), was introduced into the dough at a level of 0.03 gram. No additive was incorporated into the fourth dough which was to be used for control purposes. The separate doughs were baked into biscuits by heating at a temperature of 450° F. for a period of about twelve minutes.

The biscuits, thus produced, were submitted to a taste panel for evaluation. The panel found that the control biscuits were bland and lacking in flavor. Further, it found that the biscuits which were prepared from the mixtures containing the products of sections (a), (b) and (c) of this example exhibited the flavor and aroma of freshly baked bread.

EXAMPLE 4

(a) In this example, 1.0 part of acid hydrolyzed gelatin was mixed with 1.0 part of glycerol and the mixture was heated to, and maintained at, a temperature of about 50° C. for a period of about five minutes. The hydrolyzed gelatin employed provided the ingredients proline, glutamic acid, glycine and valine in at least the weight ratio of 2:0.1:0.05:0.05, respectively.

(b) The product, thus obtained, was evaluated for its ability to impart flavor and aroma to bakery products. In this evaluation, 100 grams of a commercial flour mix containing flour and leavening were mixed with 27 grams of peanut oil and 62 grams of skim milk. Thereafter, 0.15 gram of the product of section (a) of this example was added. The mixture was baked into biscuits at a temperature of 450° F. for a period of about 12 minutes. For comparative purposes, biscuits were prepared in a similar manner using the same dough. In the control experiment, however, the product produced as described in section (a) of this example was not employed.

The biscuits, thus obtained, were submitted to a taste panel for evaluation. It was found that the biscuits baked from a dough containing the product of section (a) of this example had the flavor and aroma of freshly baked bread. On the other hand, the biscuits prepared from the dough which did not contain the flavor-aroma enhancer was bland and lacking in taste.

(c) The procedure of section (a) of this example was repeated using an enzymatic hydrolyzed gelatin product (1.0 part) and propylene glycol (1.0 part). Biscuits baked as described in section (b) of this example in the presence of 0.15 gram of the product were found by a taste panel to possess the flavor and aroma characteristics of freshly baked bread.

EXAMPLE 5

This example is included herein to demonstrate the utility of invention in a continuous bread making process.

In the first step of the process, a preferment was prepared containing 3.0 parts of yeast, 3.0 parts of milk, 10.0 parts of sugar, 0.07 part of calcium phosphate, 2.0 parts of salt, 10.0 parts of flour and 67 parts of water. The preferment was allowed to ferment for a period of about two hours. This mixture was pumped into a mixer and while mixing, the following named ingredients were added in the quantities hereinafter indicated:

| | Parts |
|---|---|
| Flour | 90.0 |
| Shortening (melted at 140° F.) | 3.0 |
| Potassium iodate | 0.001 |
| Potassium bromate | 0.005 |
| Ascorbic acid | 0.02 |

Subsequently, 0.1 part of the aqueous product of Example 1 was added. The entire mixture was mixed for a period of about five minutes to produce a dough. The dough was then passed into a chamber under positive pressure with large mixing panels to incorporate air into the mixture. As the dough emerges from the chamber it was cut into pieces, dropped into pans on a conveyor belt and conveyed into and through the baking ovens. The bread was baked at a temperature of 475° F.

For control purposes, bread was baked using, with but one exception, the ingredients named in the preceding paragraph, utilizing the same process equipment and operating conditions. In the control experiment the flavor and aroma imparting product of Example 1 was not used.

The bread baked as described herein was submitted to a panel for flavor and aroma evaluation. It was the judgment of the panel that the bread baked in the control experiment was bland and lacking in taste. In contrast, the panel found that the bread, prepared from a mixture containing the product of Example 1, possessed the characteristic flavor and aroma of freshly baked bread.

EXAMPLE 6

Bread was baked by the continuous procedure described in Example 5 using, with but one exception, the same ingredients and the same quantities as were used in that example. In this example, 0.15 part of the product produced by heating an acid hydrolyzed gelatin product in glycerol, as described in Example 4, was employed, in place of the product of Example 1 used in the preceding example, to enhance the flavor and aroma of the baked bread. In a control experiment, bread was baked using the same ingredients, without the flavor-aroma enhancer.

The bread thus prepared was submitted to a taste panel for evaluation. It was the judgment of that panel that bread, prepared from the dough which contained, as an additive, the product of Example 4, had the flavor and aroma characteristics of freshly baked bread. In contrast, bread baked in the control experiment, i.e., bread obtained from a dough containing no additive, was bland and lacking in flavor.

I claim:

1. A method of imparting flavor and aroma to a bakery product which comprises incorporating into the unbaked dough an effective amount of a flavor and aroma imparting composition produced by heating at a temperature of from about 50° C. to about 175° C. for a period of from about five minutes to about sixty minutes a mixture comprising from about 90% to about 35% by weight acid hydrolyzed gelation and from about 10% to about 65% by weight of a member selected from the group consisting of glycerol and propylene glycol, and baking the mixture, thus obtained, at an elevated temperature.

2. A method of imparting flavor and aroma to a bakery product which comprises incorporating into the unbaked dough an effective amount of a flavor and aroma imparting composition produced by heating at a temperature of from about 50° C. to about 175° C. for a period of from about five minutes to about sixty minutes a mixture comprising from about 90% to about 35% by weight enzymatic hydrolyzed gelatin and from about 10% to about 65% by weight of a member selected from the group consisting of glycerol and propylene glycol, and baking the mixture, thus obtained, at an elevated temperature.

References Cited

UNITED STATES PATENTS 3,425,840  2/1969  Hunter et al. _____ 99—40X
3,478,015  11/1969  Onishi et al. _____ 99—86X RAYMOND N. JONES, Primary Examiner W. BOVEE, Assistant Examiner U.S. Cl. X.R.

99—90